United States Patent Office 3,434,982
Patented Mar. 25, 1969

3,434,982
POLYURETHANES PREPARED FROM OXY-
ALKLATED CYANOGUANIDINES
Donald W. Kaiser, Hamden, and John K. Zane, East Haven, Conn., assignors to Olin Mathieson Chemical Corporation, a corporation of Virginia
No Drawing. Original application May 1, 1963, Ser. No. 277,124, now Patent No. 3,271,411, dated Sept. 6, 1966. Divided and this application Oct. 18, 1965, Ser. No. 510,120
Int. Cl. C08g 22/44, 22/14; C09k 3/28
U.S. Cl. 260—2.5                        4 Claims

ABSTRACT OF THE DISCLOSURE

The specification discloses a process for producing polyurethanes which comprises reacting an organic polyisocyanate with a hydroxy containing material prepared by reacting (1) cyanoguanidine, (2) a composition having a functionality of at least two, such as a glycol, triol or amino alcohol, and (3) an alkylene oxide. Foams may be produced by including a blowing agent in the process. The foams have improved flame retardance, humid-aging properties and hydrolytic stability.

This application is a division of copending application Ser. No. 277,124, filed May 1, 1963, by D. W. Kaiser and J. K. Zane, now U.S. Patent No. 3,271,411, issued Sept. 6, 1966.

The present invention relates to a novel process for coalkoxylating cyanoguanidine admixed with certain polyols and for the manufacture of polyurethane compositions by reacting the coalkoxylated mixtures with polyisocyanates.

By the term "coalkoxylation" in the present specification and claims, it is intended to mean alkoxylation using alkylene oxides having three to eight carbon atoms. Suitable polyols and alkylene oxides are more particularly defined below.

The present invention relates in one aspect to the coalkoxylation of mixtures containing cyanoguanidine and certain polyols. Heretofore, cyanoguanidine has been exceedingly difficult to alkoxylate. It has been frequently impossible to obtain any product whatever. Attempted alkoxylations in the absence of solvent or with conventional solvents for this type of reaction, for example, ethylene glycol dimethyl ether, diethylene glycol dimethyl ether, dioxane and xylene yield only starting materials or severe conditions are required to obtain but poor yields of alkoxylation products. U.S. Patent 2,349,557, issued May 23, 1944, to McClellan et al., and U.S. Patent 2,375,-012, issued May 1, 1945, to the same inventors, discloses an uncatalyzed reaction of cyanoguanidine with ethylene oxide in the presence of considerable amounts of water. However, several hours at temperatures up to 125° C. were required to combine two molecules of ethylene oxide with one of cyanoguanidine.

It has been found, surprisingly and unexpectedly, that cyanoguanidine can be readily and conveniently reacted with an alkylene oxide in the presence of certain polyols as described below to form coalkoxylation products of the cyanoguanidine and of the polyol components. The coalkoxylation products are obtained in excellent yields and are especially useful in the manufacture of polyurethane products. The reaction is conducted in the presence of a basic catalyst, at a temperature of between about 75 and 175° C. and the ratio of the cyanoguanidine-polyol mixture to alkylene oxide is from 1:2 to 1:125, preferably from 1:2 to 1:10.

Polyols suitable for use in the present invention contain at least two hydroxyl groups and may be aliphatic or aromatic, saturated or unsaturated. The preferred polyol is glycerol due to availability and ease of reaction. Others which may be employed include ethylene glycol, propylene glycol, 1,4-butanediol, diethylene glycol, dipropylene glycol, neopentyl glycol, triethylene glycol, hexamethylene glycol, hexanetriol, 2-butene-1,4-diol, 2-butyne-1,4-diol and butanetriol. In addition, many polyols, when propoxylated or otherwise alkoxylated, are especially useful. For example, trimethylolpropane, trimethylolethane, pentaerythritol, polyglycerol, dipentaerythritol, polypentaerythritol, erythritol, mannitol, sorbitol, bisphenol-A (diphenylolpropane), resorcinol, catechol, hydroquinone, alkyl glucosides, for example, methyl glucoside and 4,4'-dihydroxybenzophenone, when propoxylated, are excellent. Polyols having three or more hydroxyl groups are preferred for coalkoxylation with cyanoguanidine in order to increase the functionality of the composition. All of these polyols alkoxylate to form excellent reaction media and coalkoxylation products.

Polyol amines can be used in place of or in admixture with the above-mentioned polyols. The additional nitrogen content of these amines and their additional basicity, when later neutralized, contribute advantageously to the fire retardant properties of the resultant urethanes. Polyol amines advantageously include the alkanolamines, especially monoethanolamine, diethanolamine and triethanolamine. These polyol amines are especially preferred since they all have functionality of three and are readily coalkoxylated with the cyanoguanidine. They also form polyols which are excellent reaction media. Suitable polyol amines may also be prepared in situ by alkoxylation of amines having a functionality of at least two. Suitable amines for alkoxylation can be aliphatic or aromatic, mono or polyamines with the proviso that they shall have a functionality of at least two and preferably more than two. Functionality in the present specification and claims means the number of hydrogen atoms in the molecule which are reactive with alkylene oxides. For example, polyamines including ethylene diamine and polyalkylene polyamines, including diethylene triamine and triethylene tetramine and aromatic polyamines, for example, toluylene diamine are especially useful. Primary monoamines have a functionality of two and are suitable especially in combination with polyols and cyanoguanidine. In this way, aniline and toluidine are useful. The lower aliphatic primary monoamines are useful especially when used under pressure. Examples include methylamine, ethylamine, butylamines and hexylamines. All of these amines coalkoxylate rapidly under the reaction conditions with the cyanoguanidine to form suitable polyol products for foam preparation.

The reaction is preferably conducted without the addition of any inert solvent, the use of the polyols described above avoiding the necessity of later removing an inert solvent. However, in some instances the additional incorporation of an inert solvent in the mixture is desirable in spite of the necessity of removing it later. For this purpose, the addition of dimethyl sulfoxide is advantageous. Especially advantageous results are obtained when the dimethyl sulfoxide constitutes 5 to 100 percent of the solvent used since then the cyanoguanidine is more readily dissolved and alkoxylated. The total solvent component may consist of the dimethyl sulfoxide, or for economy, varying amounts of less expensive solvents may be employed, for example, diethylene glycol dimethyl ether. When the alkoxylation reaction is completed, the inert solvent is removed by distillation at atmospheric or preferably under reduced pressure. Alternatively the cyanoguanidine-polyol mixture can be partially oxyalkylated, the inert solvent removed by distillation and the oxyalkylation continued. The proportion of cyanoguanidine-polyol mixture to dimethyl sulfoxide, when employed is appropriately from 1:1 to 1:5.

When a mixture containing at least 10 percent by weight of suitable polyol and at least 10 percent of the cyanoguanidine is employed, both the cyanoguanidine and the polyol are surprisingly readily alkoxylated without difficulty by simply admixing the reactants in the desired proportions at the desired temperature and in the presence of a basic catalyst. To facilitate the reaction, it may be carried out under pressure of up to about 50 p.s.i.g. The oxides can be introduced either in gases or liquids.

In the present specification and claims, the term alkylene oxide is intended to include alkylene oxides having 3 to 8 carbon atoms including alkylene oxides containing non-interfering substituents. The term is intended to include carbocyclic oxides having 8 carbon atoms or less, for example, styrene oxide. The unsubstituted alkylene oxides, especially the lower alkylene oxides are preferred, for example, propylene oxide, butylene oxide, isobutylene oxide and n-hexylene oxide. The cycloalkylene oxides may be for example, cyclobutylene oxide and cyclohexylene oxide.

The reaction is accelerated by employing elevated temperatures from 75 to 175° C. and preferably from 90° to 140° C. and by the use of basic catalysts, either organic or inorganic. The catalyst is preferably an alkali metal hydroxide or alkoxide, for example, sodium hydroxide, potassium hydroxide and sodium methoxide. The reaction is initially exothermic and cooling is normally employed to maintain the reaction at the desired temperature. The reaction time is not critical and will vary depending upon the degree of completion desired, temperature and reactants.

The ratio of the cyanoguanidine-polyol mixture to alkylene oxide may vary from 1:2 to 1:125. Thus alkoxylation products may be tailor-made for particular properties depending upon the proportion of alkylene oxide employed. The properties of the resultant mixture depends on the character of the substituents and the proportion of algylene oxide employed.

The coalkoxylation product is treated with acid to neutralize the basic catalyst and the basic alkoxylation products themselves. Advantageously the apparent pH is adjusted to about 6 to 12. (The "apparent pH" as this term is used in the present specification, including the examples, is determined by measuring the pH of a solution of 10 grams of the sample in 50 ml. of a mixture of 10 parts by volume of isopropanol and 6 parts of water). The acid used for neutralization of the catalyst is not critical. For example, inorganic acids including monoammonium phosphate, sulfamic, phosphoric, hydrochloric or sulfuric acids are useful. Also useful are organic acids including acetic, trichloroacetic, oleic, linoleic and tall oil.

Cyanoguanidine is essentially a neutral compound, with dissociation constants of:

$$K_a\ 25°\ C.=6\times10^{-15}$$
$$K_b\ 0°\ C.=3\times10^{-15}$$

However, the alkoxylated products are strongly basic. It is believed that propylene oxide, for example, reacts in the following fashion to create a strong base, which is then further oxypropylated:

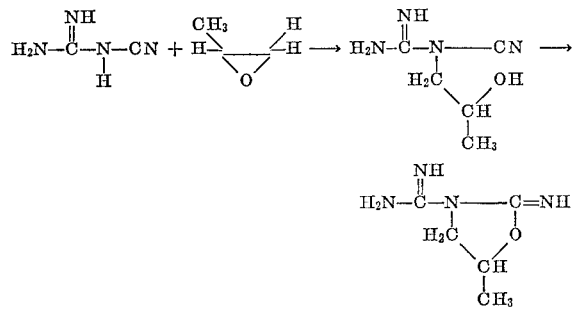

The invention is not limited, however, to the above interpretation.

Finally it is advantageous to treat the alkoxylation reaction product by adding a clarifying or decolorizing agent, for example, adsorptive clay, either before or after neutralization and ultimately removing it, for example, by filtration.

The coalkoxylation products of the present invention have highly desirable characteristics as the polyol component in flexible, rigid and semirigid polyurethane film or in foam compositions by reaction with a diisocyanate in the presence of a foaming agent and catalyst. Polyurethane foams are formed which are characterized by greatly improved flame retardance, humid-aging properties and hydrolytic stability.

Suitable organic polyisocyanates which may be employed in the preparation of the polyurethane foams include diisocyanates, triisocyanates, and polyisocyanates. Especially preferred are mixed isomers of toluylene diisocyanate which are readily available commercially. Other suitable isocyanates include methylenebis(4-phenylisocyanate), 3,3'-bitolylene-4,4'-diisocyanate, 3,3'-dimethoxy-4,4'-biphenylene diisocyanate, naphthalene-1,4-diisocyanate, hexamethylene diisocyanate, PAPI (polymethylene polyphenyl isocyanate) and 1,4-phenylene diisocyanate. The amount of isocyanate employed in the preparation of the polyurethane foams should be sufficient to provide at least 0.7 NCO groups based on the number of hydroxyl groups present in the coalkoxylation products of the present invention, the number of hydroxyl groups in any additive employed and the number of hydroxyl groups employed in the foaming agent. An excess of isocyanate compound may be conveniently employed; however, this is generally undesirable due to the high cost of the isocyanate compounds. It is preferable, therefore, to employ no greater than 1.5 NCO groups based on the number of hydroxyl groups and preferably between about 0.9 and 1.1 NCO groups.

Prepolymers can be formed from the polyols of the present invention by reaction with a suitable excess of a diisocyanate. The proportion of diisocyanate in these prepolymers is suitable to provide from 1.4 to 3.0 NCO groups per hydroxyl group. The prepolymers are subsequently reacted with additional polyol with or without additional diisocyanate in applications where the use of prepolymers is advantageous.

The polyurethane foams are prepared in the presence of a foaming agent and a reaction catalyst. The foaming agent employed may be any of those known to be useful for this purpose, such as water, the halogenated hydrocarbons and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform and carbon tetrachloride. The amount of foaming agent employed may be varied within a wide range. Generally however, the halogenated hydrocarbons are employed in an amount of from 1 to 50 parts by weight per 100 parts by weight of the adduct of the present invention, and generally the water, when employed, is in an amount of from 0.1 to 10 parts by weight per 100 parts by weight of the adduct of the present invention.

The polyurethane foams are prepared in the presence of a catalytic amount of a reaction catalyst. The catalyst employed may be any of the catalysts known to be useful for this purpose, including tertiary amines and metallic salts. Suitable tertiary amines include N-methyl morpholine, N-hydroxyethyl morpholine, triethylene diamine, triethylamine, trimethylamine and N,N-dimethylethanolamine. Typical metallic salts include, for example, the salts of antimony, tin and iron, for example, dibutyltin dilaurate and stannous octoate. The catalyst is usually employed in an amount of from 0.1 to 2.0 percent by weight based on the coalkoxylation product of the present invention.

In the preparation of the polyurethane foams of the present invention minor amounts of emulsifier are preferably used to improve the cell structure of the polyurethane foam. Typical of such emulsifiers are the silicone oils and soaps. Generally up to 2 parts by weight of the surfactant is employed per 100 parts of polyol.

Various additives can be employed which serve to provide different properties, e.g., fillers, such as clay, calcium carbonate or calcium sulfate. These additives lower the cost and improve physical properties. Dyes may be added for color, and fibrous glass, asbestos, or synthetic fibers may be added for strength. In addition, plasticizers, deodorants and anti-oxidants may be added.

The polyurethane foams of the present invention are not readily combustible, due to their high nitrogen content and to their content of neutralized acid. They retain these qualities after long exposure to elevated temperature and high humidity, thus widely expanding their range of utility. In addition, the alkoxylation products of the present invention are prepared from inexpensive raw materials and can be tailor-made to suit desired viscosity and hydroxyl number requirements. They are surprisingly low in viscosity and many are high in hydroxyl number both of which are highly desirable for polyurethane foam manufacture. Unexpectedly, the foams have a delayed rise time and short tack free time which makes them especially valuable for closed molding.

EXAMPLE I

Copropoxylation of cyanoguanidine and glycerol (1:1)

A. *Copropoxylation.*—A stirred mixture of 84 g. (1.0 mole) of cyanoguanidine, 6 g. of 85 percent potassium hydroxide, and 92 g. (1.0 mole) of glycerol was heated to 100° C. under a nitrogen atmosphere and propylene oxide was gradually added. Initially, reaction was slow, but as propylene oxide was added, the reaction rate increased, and propoxylation soon became exothermic. A total of 879 g. (15.1 moles) of propylene oxide was reacted. When cool, the catalyst was neutralized with 5.5 g. of glacial acetic acid. An additional 100 g. of acetic acid was added to lower the pH. Attapulgus clay (35 g.) was added and the mixture stripped for an hour at 110° C. under water pump vacuum before filtration through Celite covered paper. A final stripping was given the filtrate at 150° C. at 1 to 2 mm. Analysis gave the following values:

Hydroxyl number _____ 328
Acid number _____ 6.0
Water, percent _____ 0.07
Apparent pH _____ 8.2
Viscosity at 100° F., centistokes _____ 399

B. *Foam preparation.*—The copropoxylated polyol of this example was used in the preparation of a polyurethane foam by mixing the following components.

Component:                                  Parts by wt.
  Polyol of Example I-A _____ 100
  Emulifier (silicone) _____ 1.0
  Catalyst (stannous octoate) _____ 0.1
  Foaming agent (Freon–11) _____ 25
  Toluylene diisocyanate _____ 55

Freon–11 is trichloromonofluoromethane.

EXAMPLE II

Copropoxylation of cyanoguanidine and glycerol (2:1)

A stirred mixture of 84 g. (1.0 mole) of cyanoguanidine, 92 g. (1.0 mole) of glycerol, and 10 g. of 85 percent potassium hydroxide was heated to 75° C. under nitrogen. After reaction with 193 g. of propylene oxide, a colorless, viscous syrup was obtained. Another 84 g. (1.0 mole) of cyanoguanidine was then added and propoxylation continued at 100° C. The total propylene oxide reacted was 754 g. The catalyst in the resulting syrup was neutralized with 8.7 g. of 85 percent phosphoric acid. Addition of 1208 g. of Unitol DT (tall oil) and 100 g. of Attapulgus clay was made and the mixture stripped at 150° C. at 1 to 2 mm. for 4 hours. The hot syrup was then filtered through Celite covered paper. The product gave the following analyses.

Hydroxyl number _____ 226
Alkaline number _____ 1.71
Percent water _____ 0.09
Apparent pH _____ 8.1
Viscosity, 100° F., centistokes _____ 1132

EXAMPLE III

Copropoxylation of glycerol and cyanoguanidine (2:1)

A. *Copropoxylation.*—One mole of cyanoguanidine (84 g.) was stirred with one mole of glycerol (92 g.) and 10 g. of 85 percent potassium hydroxide under an atmosphere of nitrogen. The mixture was heated to 75° C. and 281 g. (4.85 moles) of propylene oxide was passed into the mixture. A second mole of cyanoguanidine was added and propoxylation resumed.

When a total of 754 g. (13 moles) of propylene oxide had reacted, the catalyst was neutralized with 8.75 g. of 85 percent phosphoric acid. The addition of the 604 g. of tall oil (Unitol DT) was followed by treatment with 75 g. of Attaclay at 100° C. under 20 to 30 mm. pressure for 2 hours. Filtration through Celite was followed by a final stripping below 1 mm. at 150° C. Analyses gave the following values:

Hydroxyl number _____ 356
Alkaline number _____ 5.05
Water, percent _____ 0.04
Apparent pH _____ 12.0
Viscosity, 100° F., centistokes _____ 765

B. *Foam preparation.*—A good polyurethane foam was prepared from the copropoxylated polyol obtained in A above by preparing a mixture containing the following components.

Component:                                  Parts by wt.
  Polyol of Example III-A _____ 100
  Emulsifier (silicone) _____ 3.0
  Catalyst (stannous octoate) _____ 0.2
  Foaming agent (Freon–11) _____ 25
  Toluylene diisocyanate _____ 59

EXAMPLE IV

Copropoxylation of glycerol and cyanoguanidine (1:1)

A. *Copropoxylation.*—A stirred mixture of 168 g. of cyanoguanidine (2.0 moles), 184 g. (2 moles) of glycerol, and 12 g. of 85 percent potassium hydroxide was heated to 85° C. under nitrogen. Propoxylation was begun at 85° C. but the temperature was gradually increased to 120° C. to complete the addition of 1442 g. (24.5 moles) of propylene oxide.

The mixture was neutralized to pH 6 by the addition of 840 g. of 10 percent hydrochloric acid of which 66 g. were required to neutralize the catalyst. Stripping of the water was then accomplished at 90–100° C. under 20 to 30 mm. pressure. Treatment with 100 g. of Attaclay was followed by stripping at pressures under 1 mm. at 150° C. The product was filtered thru Celite. Analyses gave the following values:

Hydroxyl number _____ 357
Acid number _____ 50.49
Water, percent _____ 0.12
Apparent pH _____ 6.1
Viscosity, 100° F., centistokes _____ 1254

To reduce the acid number the product was diluted with water and treated with sodium bicarbonate to yield an apparent pH of 7.5. After stripping and refiltering as before, the following analyses were obtained:

Hydroxyl number _____ 386
Acid number _____ 8.2

| | |
|---|---|
| Water, percent | 0.10 |
| Apparent pH | 8.6 |
| Viscosity, 100° F., centistokes | 656 |

B. *Foam preparation.*—The following formulation was used in preparing a foam:

| Component: | Parts by wt. |
|---|---|
| Polyol of Example IV-A | 100 |
| Emulsifier (silicone) | 1.3 |
| Catalyst (stannous octoate) | 0.6 |
| Foaming agent (Freon-11) | 25 |
| Toluylene diisocyanate | 65 |

EXAMPLE V

Copropoxylation of triethanolamine with cyanoguanidine

A stirred mixture of 13.2 g. (0.20 mole) of 85 percent KOH and 224 g. (1.5 moles) of triethanolamine were heated at 100° C. under water aspirator vacuum until all of the KOH dissolved and water was removed. Propoxylation was then begun and about 250 g. of the oxide was reacted. Then 125 g. (1.5 moles) of cyanoguanidine was added and the mixture was stirred at 100° C. until a smooth white slurry had formed. Propoxylation was resumed and 405 g. of propylene oxide was introduced.

A second quantity of 125 g. (1.5 moles) of cyanoguanidine was added to the mixture. Propoxylation was then completed by the introduction of propylene oxide to a total amount of 1452 g. (25 moles).

The light yellow solution was neutralized with a total of 407.4 g. of sulfamic acid slurried with 500 ml. of water. Of this amount, 19.4 g. of the acid were required to neutralize the catalyst. The sample was treated with 60 g. of adsorptive clay, stripped to a final temperature of 150° C. under 0.5 mm. pressure and filtered. The product gave the following analyses:

| | |
|---|---|
| Hydroxyl No. | 39.8 |
| Acid No. | 2.2 |
| Apparent pH | 8.4 |

What is claimed is:

1. A process for preparing a polyurethane which comprises admixing and reacting:
    (A) an organic polyisocyanate,
    (B) a reaction catalyst, and,
    (C) a hydroxy containing material prepared by a process which comprises (I) forming a reaction mixture by admixing: (1) a basic catalyst, (2) cyanoguanidine, and (3) a composition having a functionality of at least two selected from the group consisting of glycerol, ethylene glycol, propylene glycol, 1,4-butanediol, diethylene glycol, dipropylene glycol, neopentyl glycol, triethylene glycol, hexamethylene glycol, hexanetriol, 2-butene-1,4-diol, 2-butyne-1,4-diol, butanetriol, oxypropylated trimethylolpropane, oxypropylated trimethylolethane, oxypropylated pentaerythritol, oxypropylated dipentaerythritol, oxypropylated erythritol, oxypropylated mannitol, oxypropylated sorbitol, oxypropylated diphenylolpropane, oxypropylated resorcinol, oxypropylated catechol, oxypropylated hydroquinone, oxypropylated methyl glucoside, oxypropylated 4,4'-dihydroxybenzophenone, monoethanolamine, diethanolamine, triethanolamine, and mixtures thereof, and (II) heating said reaction mixture to a temperature between 75° C. and 175° C. while passing into said reaction mixture an oxide (4) selected from the group consisting of styrene oxide, propylene oxide, butylene oxide, isobutylene oxide, n-hexylene oxide, cyclobutylene oxide, cyclohexylene oxide, and mixtures thereof,
    (D) the weight ratio of the sum of (2)+(3) to (4) being between about 1:2 and 1:125,
    (E) the weight ratio of (2) to (3) being between about 10:90 and 90:10,
    (F) the ratio of (A) to (C) being such that there are 0.7 to 1.5 —NCO groups for each hydroxy group contained in (C), and
    (G) the ratio of (B) to (C) being from 0.1 to 2 parts of (B) per 100 parts of (C).
2. The process of claim 1 wherein a blowing agent is used.
3. A polyurethane produced by the process of claim 1.
4. A polyurethane foam produced by the process of claim 2.

References Cited

UNITED STATES PATENTS

| | | | |
|---|---|---|---|
| 3,262,941 | 7/1966 | Kaiser | 260—307 |
| 3,271,411 | 9/1966 | Kaiser et al. | 260—307 |
| 3,288,733 | 11/1966 | Kaiser | 260—2.5 |
| 3,321,415 | 5/1967 | Hennig et al. | 260—2.5 |
| 3,330,830 | 7/1967 | Kaiser | 260—249.6 |

DONALD E. CZAJA, *Primary Examiner.*

M. J. WELSH, *Assistant Examiner.*

U.S. Cl. X.R.

260—37, 77.5, 307